US010946457B2

(12) United States Patent
Evatt et al.

(10) Patent No.: US 10,946,457 B2
(45) Date of Patent: Mar. 16, 2021

(54) POCKET HOLE JIG

(71) Applicant: TTI (MACAO COMMERCIAL OFFSHORE) LIMITED, Macau (MO)

(72) Inventors: Thomas Evatt, Six Mile, SC (US); Clinton C. Thackery, Clemson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 16/161,158

(22) Filed: Oct. 16, 2018

(65) Prior Publication Data
US 2019/0111499 A1 Apr. 18, 2019

Related U.S. Application Data

(60) Provisional application No. 62/573,128, filed on Oct. 16, 2017.

(51) Int. Cl.
*B23B 47/28* (2006.01)

(52) U.S. Cl.
CPC ........ *B23B 47/287* (2013.01); *B23B 2247/10* (2013.01); *B23B 2247/12* (2013.01)

(58) Field of Classification Search
CPC .............. B23B 47/287; B23B 2247/10; B23B 2247/12; B23B 47/28; B23B 47/288; Y10T 408/5635; Y10T 408/5638; Y10T 408/566; Y10T 408/5665; Y10T 408/567; Y10T 408/568; Y10T 408/569; Y10T 408/865
See application file for complete search history.

(56) References Cited

U.S. PATENT DOCUMENTS

| | | | | |
|---|---|---|---|---|
| 2,181,746 A | * | 11/1939 | Siebrandt | A61B 17/17 606/96 |
| 2,810,310 A | * | 10/1957 | Saunders | B23B 47/288 408/109 |
| 3,465,620 A | * | 9/1969 | Hilburn | B23B 47/287 408/115 R |
| 3,626,513 A | * | 12/1971 | Pytlak | B23B 47/28 408/115 R |
| 3,689,165 A | | 9/1972 | Small | |
| 3,708,237 A | | 1/1973 | Kruse | |
| 3,914,871 A | | 10/1975 | Wolff | |
| 4,385,755 A | | 5/1983 | Mawer | |
| 5,018,912 A | * | 5/1991 | Reitz | B23B 47/28 144/106 |
| 5,063,982 A | | 11/1991 | Durney | |

(Continued)

FOREIGN PATENT DOCUMENTS

| | | |
|---|---|---|
| DE | 2915554 A1 | 10/1980 |
| DE | 19503994 A1 | 8/1996 |

(Continued)

*Primary Examiner* — Eric A. Gates
*Assistant Examiner* — Paul M Janeski
(74) *Attorney, Agent, or Firm* — Michael Best & Friedrich LLP

(57) ABSTRACT

A pocket hole jig includes a body with a base surface positionable against a workpiece, and a drill guide pivotally coupled to the body. The drill guide defines a guide axis such that a drill bit is insertable into the drill guide along the guide axis. The drill guide is pivotable relative to the body to adjust an inclination angle of the guide axis relative to the base surface.

7 Claims, 8 Drawing Sheets

(56) References Cited

U.S. PATENT DOCUMENTS

| | | |
|---|---|---|
| 5,322,396 A | 6/1994 | Blacker |
| 5,560,408 A | 10/1996 | Difranco |
| 5,676,500 A | 10/1997 | Sommerfeld |
| 6,390,738 B1 | 5/2002 | Fridman |
| 6,599,064 B1 | 7/2003 | Robinson |
| 6,637,988 B1 | 10/2003 | Park |
| 6,659,695 B2 | 12/2003 | Park |
| 6,726,411 B2 | 4/2004 | Sommerfeld et al. |
| 7,134,814 B1 | 11/2006 | Park |
| 7,967,534 B2 | 6/2011 | Mcdaniel et al. |
| 7,976,252 B2 | 7/2011 | Mcdaniel et al. |
| 8,029,214 B2 | 10/2011 | Mcdaniel et al. |
| 8,052,358 B2 | 11/2011 | Mcdaniel et al. |
| 9,782,837 B2 | 10/2017 | Pelkey |

FOREIGN PATENT DOCUMENTS

| | | | |
|---|---|---|---|
| DE | 202012103274-Ua | * 9/2012 | ............ B23B 47/28 |
| EP | 1862242 B1 | 12/2011 | |
| EP | 2179809 B1 | 10/2013 | |
| EP | 2174737 B1 | 11/2013 | |
| EP | 2179810 B1 | 1/2014 | |
| EP | 2223761 BI | 1/2014 | |
| EP | 1862244 B1 | 8/2014 | |
| EP | 2223762 BI | 7/2015 | |
| EP | 1862243 B1 | 5/2016 | |
| GB | 2071537 A1 | 6/1980 | |

\* cited by examiner

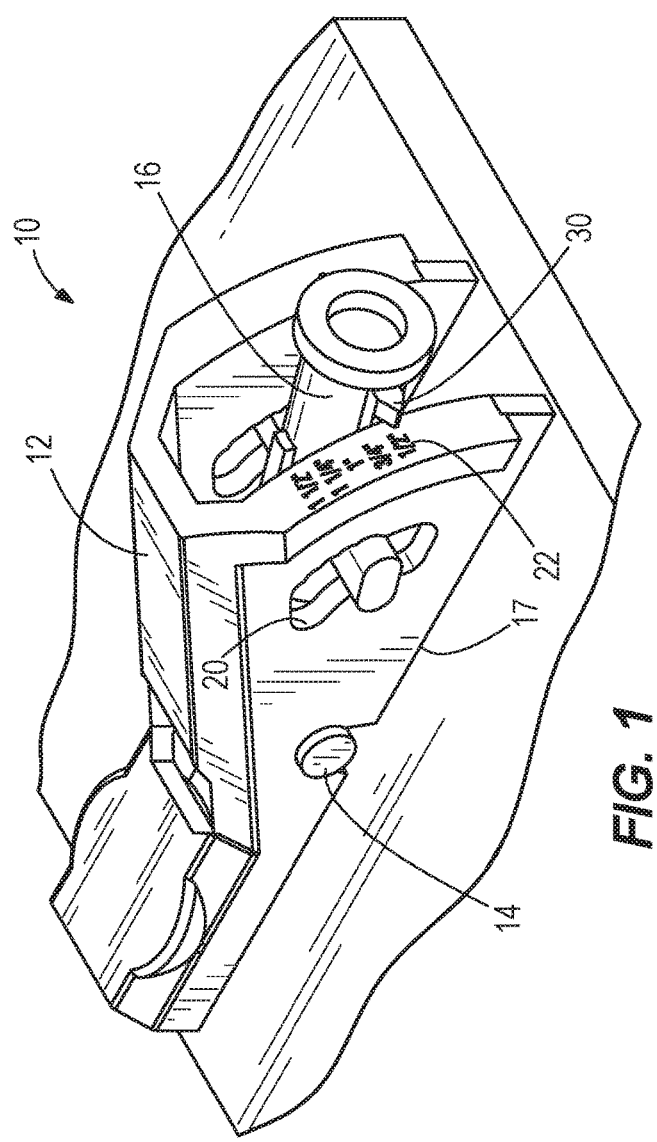
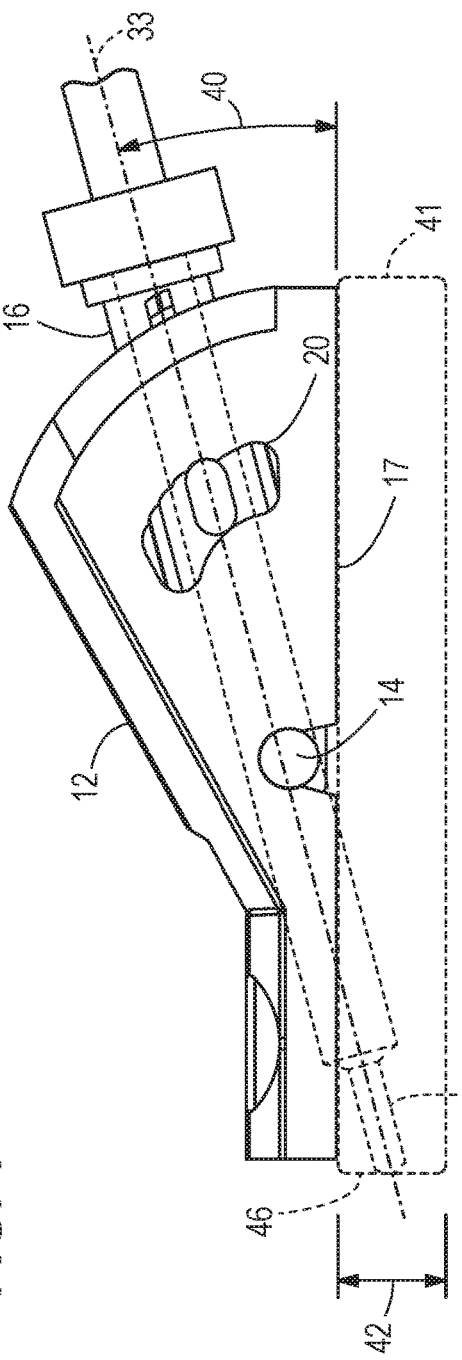

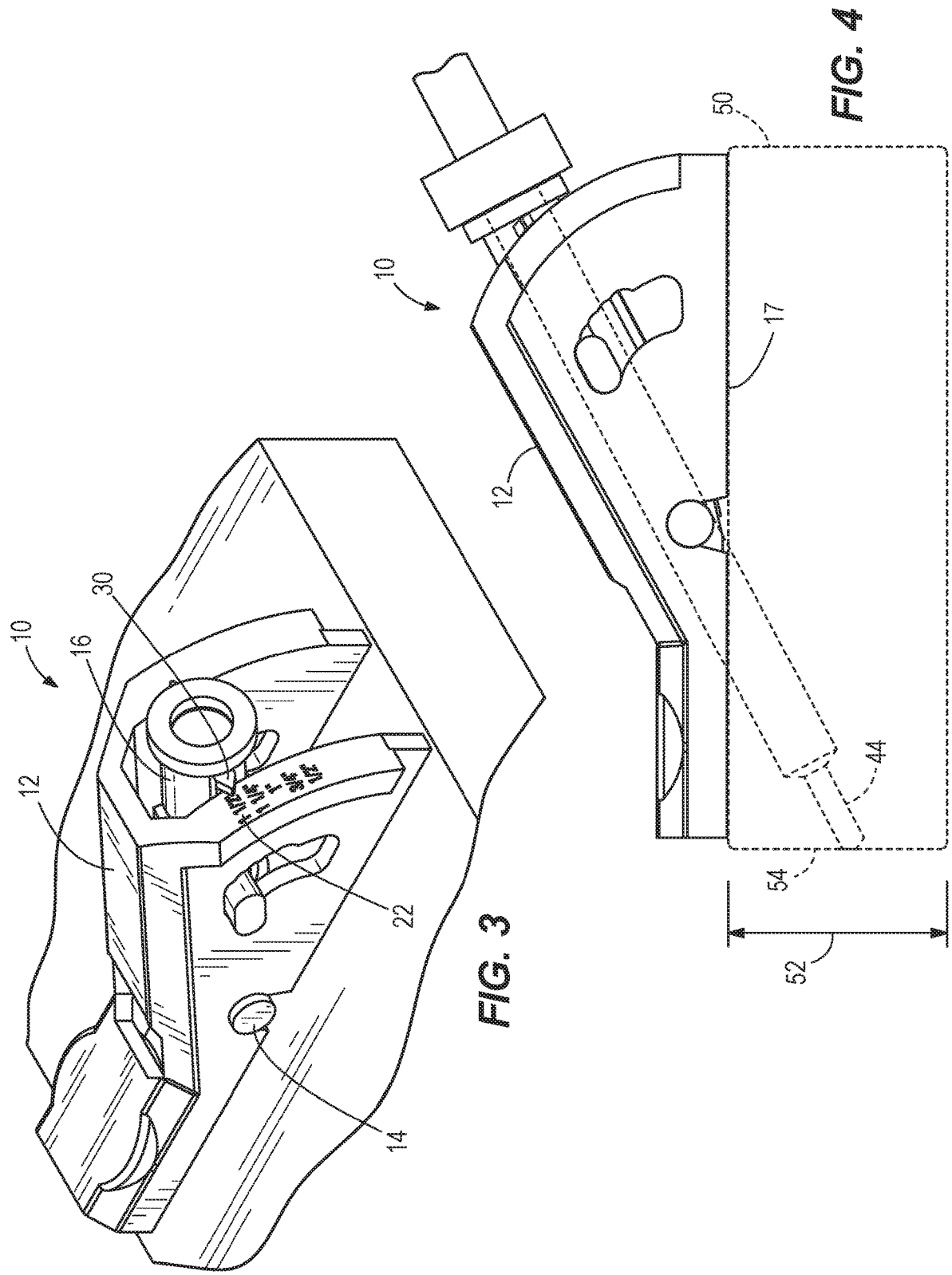

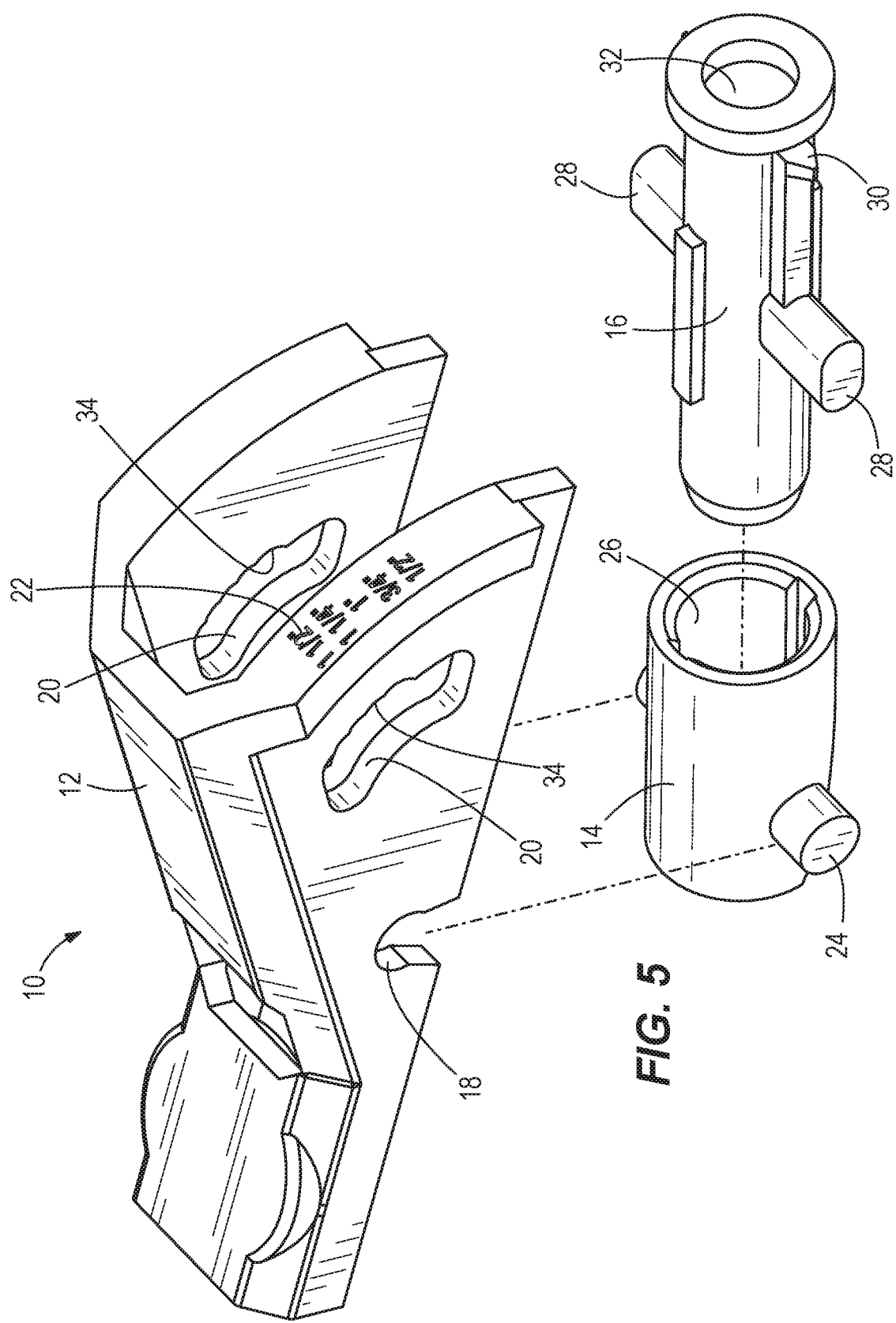

POCKET HOLE JIG

CROSS-REFERENCE TO RELATED APPLICATIONS

This application claims priority to U.S. Provisional Patent Application No. 62/573,128 filed on Oct. 16, 2017, the entire content of which is incorporated herein by reference.

BACKGROUND

The present disclosure relates to pocket hole jigs, and more particularly to pocket hole jigs that are adjustable to accommodate workpieces of different thicknesses.

SUMMARY

The present disclosure provides, in one aspect, a pocket hole jig including a body with a base surface positionable against a workpiece, and a drill guide pivotally coupled to the body. The drill guide defines a guide axis such that a drill bit is insertable into the drill guide along the guide axis. The drill guide is pivotable relative to the body to adjust an inclination angle of the guide axis relative to the base surface.

The present disclosure provides, in another aspect, a pocket hole jig including a body and a drill guide pivotally coupled to the body, the drill guide defining a guide axis such that a drill bit is insertable into the drill guide along the guide axis. The drill guide is pivotable relative to the body between a plurality of angular orientations.

The present disclosure provides, in another aspect, a pocket hole jig including a base with a body and a guide holder extending from the body, a clamp head movably coupled to the body, and a drill guide pivotally coupled to the guide holder, the drill guide including a slanted bore configured to receive a drill bit. The clamp head and the drill guide are interconnected such that movement of the clamp head relative to the base pivots the drill guide relative to the guide holder.

Other features and aspects of the disclosure will become apparent by consideration of the following detailed description and accompanying drawings.

BRIEF DESCRIPTION OF THE DRAWINGS

FIG. 1 is a perspective view of a pocket hole jig according to one embodiment of the disclosure set for use with a workpiece having a first thickness.

FIG. 2 is a side view of the pocket hole jig of FIG. 1.

FIG. 3 is a perspective view of the pocket hole jig of FIG. 1 set for use with a workpiece having a second thickness.

FIG. 4 is a side view of the pocket hole jig of FIG. 3.

FIG. 5 is an exploded view of the pocket hole jig of FIG. 1.

Figure 6:
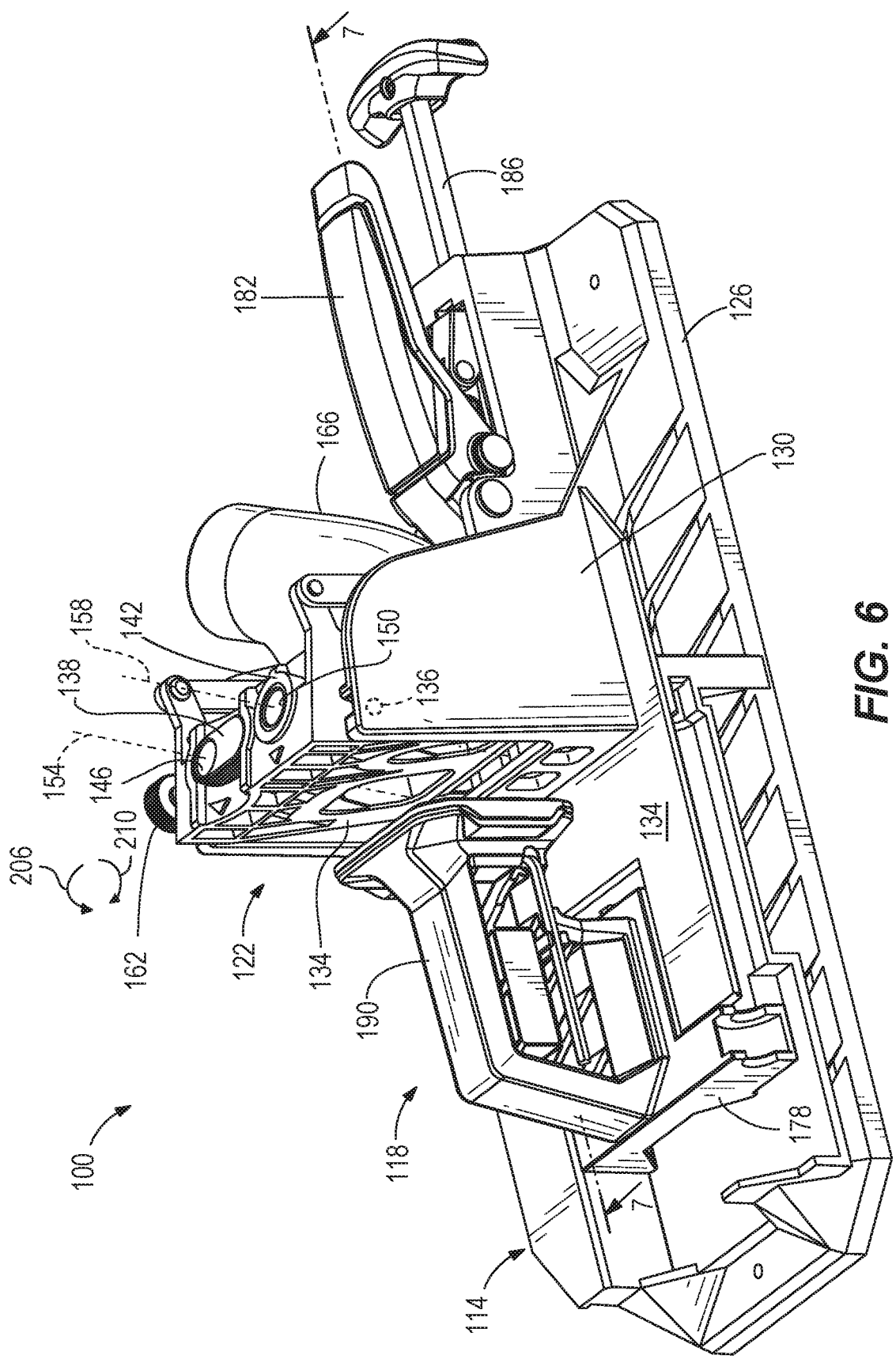
FIG. 6 is a perspective view of a pocket hole jig according to another embodiment.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrates a pocket hole jig 10. The jig 10 includes a body 12, a gimbal 14, and a drill guide 16. The body 12 includes a base surface 17, recesses 18, and arcuate slots 20 (FIG. 5). Indicia 22 corresponding to workpiece thicknesses (e.g., ½ inch, ¾ inch, etc. in the illustrated embodiment) is located adjacent the slots 20. The gimbal 14 includes posts 24 and an aperture 26 that extends centrally through the gimbal 14. The posts 24 of the gimbal 14 are received in the recesses 18 of the body 12 to pivotally couple the gimbal 14 to the body 12. The gimbal 14 is pivotally coupled to the body 12 so that the gimbal 14 pivots relative to the body 12 about the posts 24. The drill guide 16 includes posts 28, indicators 30 and an aperture 32 that extends through the drill guide 16 to define a guide axis 33 (FIG. 2). In the illustrated embodiment, the aperture 32 and the guide axis 33 extend centrally through the drill guide 16.

Referring to FIG. 5, the drill guide 16 is received in the aperture 26 of the gimbal 14 so that the drill guide 16 pivots with the gimbal 14 relative to the body 12. Posts 28 of the drill guide 16 are received in slots 20 of the body 12. The slots 20 include recesses 34 for each of the indicia 22. The posts 28 are received in the recesses 34 to releasably retain the gimbal 14 and the drill guide 16 and the position indicated by the indicator 30. The indicator 30 points to the indicia 22 of the corresponding recess 34 in which the posts 28 are received. The posts 28, recesses 34, and slots 20 are sized so that the posts 28 can move within the slots 20 by pivoting the gimbal 14 about posts 24 between both ends of the slots 20, but yet the recesses 34 hold the posts 28 of the drill guide 16, and therefore the drill guide 16 and the gimbal 14 in the desired position relative to the body 12. In some embodiments, the posts 28 may be biased into engagement with the recesses 34 (e.g., by a spring disposed between the drill guide 16 and the gimbal 14; not shown).

As illustrated in FIG. 2, the gimbal 14 is pivotable relative to the body 12 to adjust an angular orientation of the drill guide 16 relative to the body 12. In other words, pivoting the gimbal 14 and the drill guide 16 adjusts an angle of inclination 40 of the guide axis 33 relative to the base surface 17 of the body 12. The indicia 22 represent a plurality of different workpiece thicknesses. The indicator 30 and indicia 22 are calibrated such that aligning the indicator 30 with a selected indicia 22 (e.g., ½ inch in the position shown in FIGS. 1 and 2) puts the drill guide 16 in the proper orientation for drilling a pocket hole in a workpiece 41 having a thickness 42 that corresponds to the selected indicia 22. That is, when a drill bit 44 is extended through the gimbal 14 and the drill guide 16, the bit 44 exits centrally through an edge 46 of the workpiece 41 having the thickness 42.

In operation, the user grasps the drill guide 16 and pivots it (together with the gimbal 14) relative to the body 12 to select a desired workpiece thickness 42 by aligning the indicator 30 with the indicia 22 that corresponds with the desired workpiece thickness 42 (FIGS. 1 and 2). The user then positions the base surface 17 of the main body 12 on the workpiece 41, and, optionally, clamps the body 12 to the workpiece 41. The user can then insert the drill bit 44 through the drill guide 16 along the axis 43 and drill a pocket hole in the workpiece 41.

FIGS. 3 and 4 illustrate the pocket hole jig 10 being used to drill a pocket hole in a workpiece 50 having a different thickness 52 (e.g., 1½ inch). The user pivots the drill guide 16 so that the indicator 30 points to the indicia 22 corresponding to the thickness 52 of the workpiece 50. The user then positions the base surface 17 of the body 12 on the workpiece 50, and, optionally, clamps the body 12 to the workpiece 50. The user can then insert the drill bit 44 through the drill guide 16 and drill a pocket hole in the workpiece 50 (i.e. such that the dill bit 44 exits centrally through an edge 54 of the workpiece 50 having the thickness 52.

Figure 7:
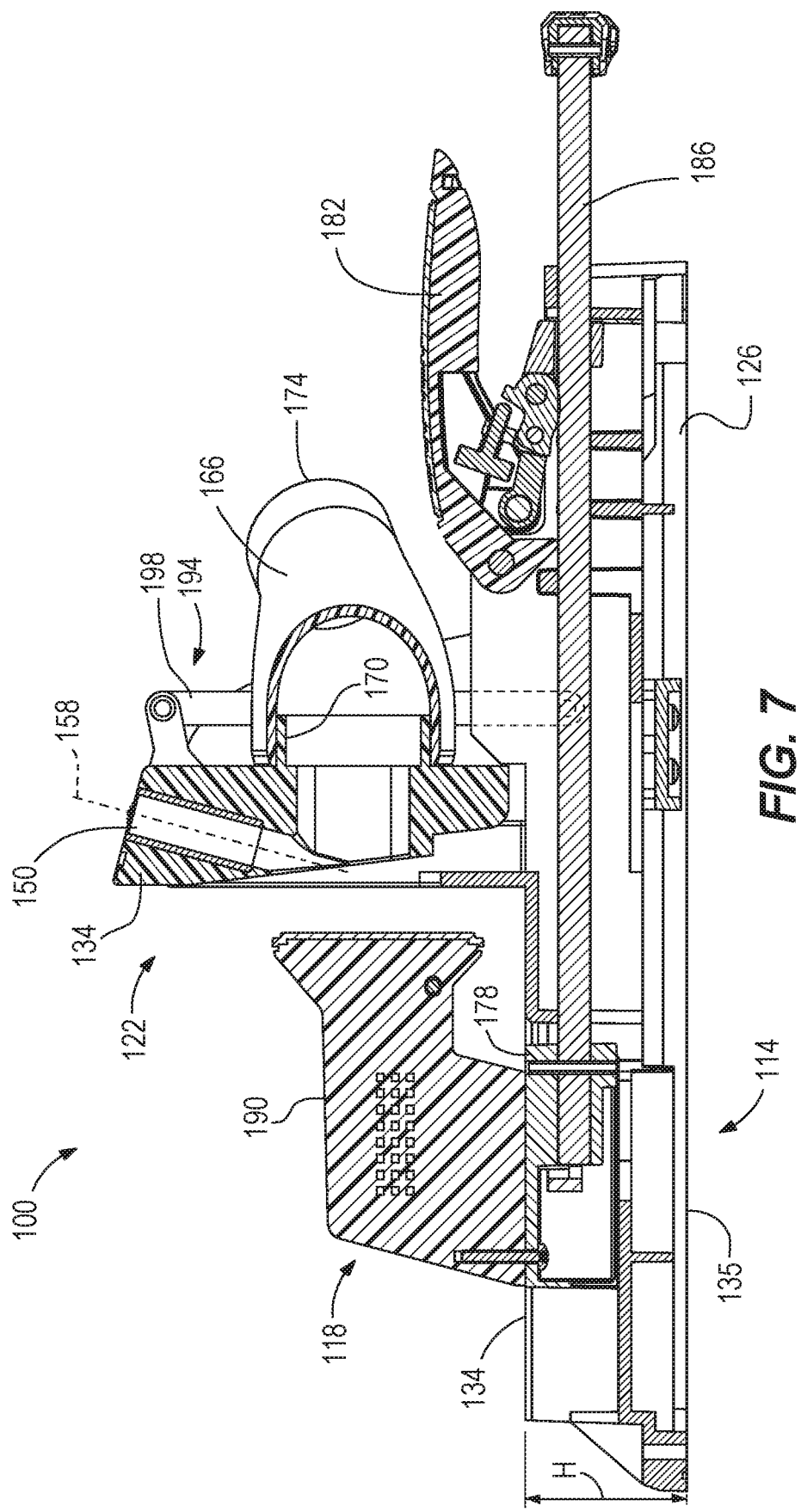
FIG. 7 is a cross-sectional view of the pocket hole jig of FIG. 6, taken along line 7-7 in FIG. 6.
Figure 8:
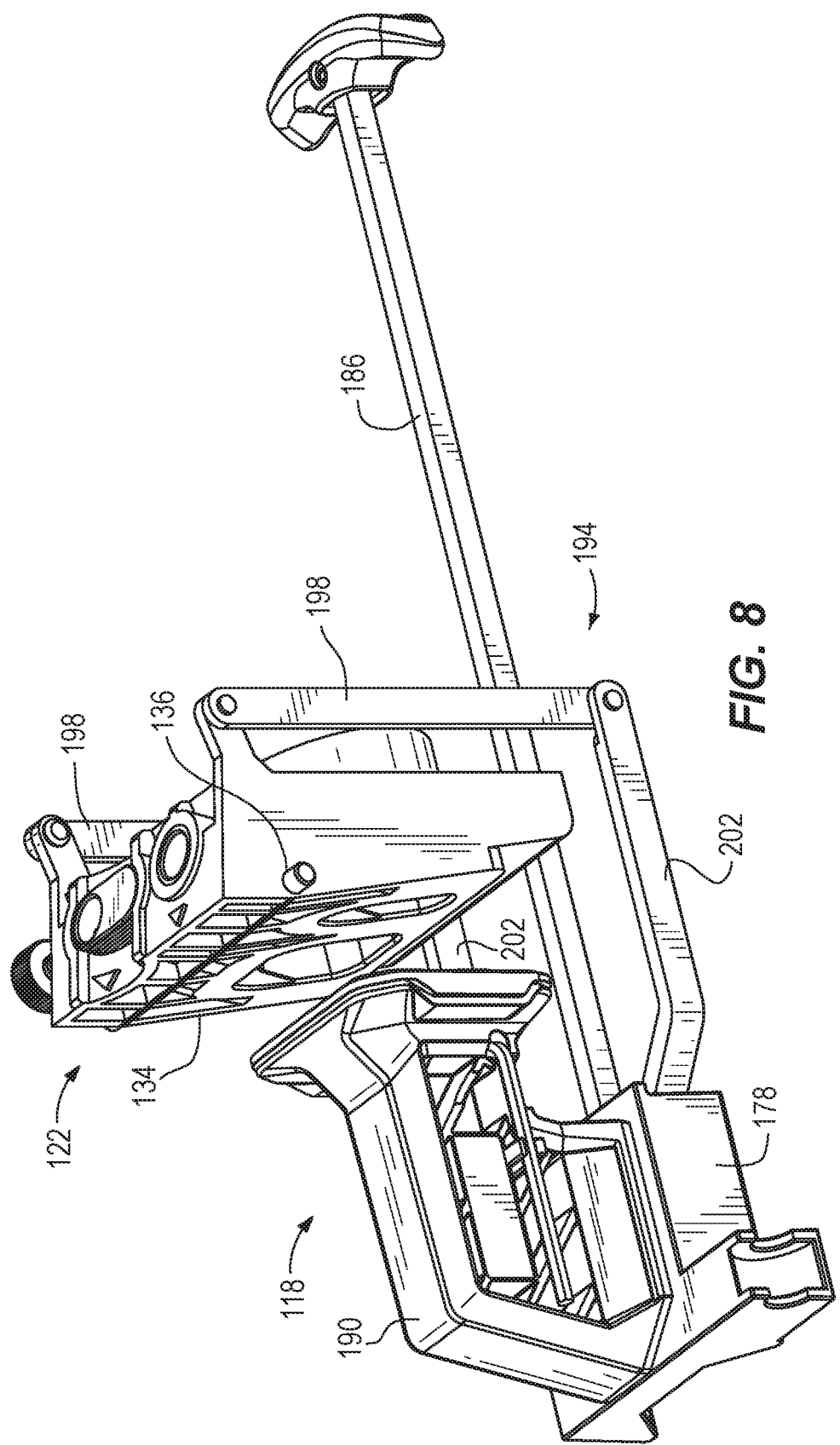
FIG. 8 is a perspective view illustrating an adjustment mechanism of the pocket hole jig of FIG. 6.

FIGS. 6-8 illustrate a pocket hole jig 100 according to another embodiment. The pocket hole jig 100 includes a base 114, a clamp assembly 118, and a drill guide assembly 122. The base 114 includes a body 126 and a guide holder 130 that projects upwardly from the body 126. The body 126 includes a substantially planar base surface 134 that is configured to support and engage a workpiece (e.g., the workpieces 41, 50) when the pocket hole jig 100 is used to facilitate drilling a pocket hole in the workpiece. In the illustrated embodiment, the body 126 and the guide holder 130 are integrally formed together as a single piece (e.g., via a molding process). In other embodiments, the guide holder 130 and the body 126 may be separate components fastened together by adhesive, welding, mechanical fasteners, or any other suitable means.

Referring to FIG. 6, the drill guide assembly 122 includes a drill guide in the form of a guide block 134 pivotally coupled to the guide holder 130 at a pivot point 136, and first and second bushings 138, 142 received within the guide block 134. The first bushing 138 includes a first cylindrical passage 146 for guiding a drill bit, and the second bushing 142 includes a second cylindrical passage 150 for guiding a drill bit. The first and second cylindrical passages 146, 150 define respective parallel guide axes 154, 158. The guide axes 154, 158 extend at an oblique inclination angle relative to the base surface 134. In the illustrated embodiment, the first bushing 138 has an oval shape and is reversible to provide two different positions for the first cylindrical passage 146. Thus, the first bushing 138 is movable between a first position to provide a first spacing between the first and second cylindrical passages 146, 150 and a second position to provide a second, different spacing between the first and second cylindrical passages 146, 150. In some embodiments, the first spacing may be between about 1 inch and about 2 inches, and the second spacing may be between about 1.5 inches and about 2.5 inches. In the illustrated embodiment, a thumb screw 162 is provided to secure the first bushing 138 in either the first position or the second position.

Referring to FIG. 7, the illustrated pocket hole jig 100 further includes a dust collector nozzle 166 coupled to a rear side of the guide holder 130. The guide block 134 includes a rearward extending dust chute 170 that is received by the dust collector nozzle 166. The dust chute 170 connects to the cylindrical passages 146, 150 in the guide block 134. The dust collector nozzle 166 includes a port 174 for connection to a vacuum hose (not shown) such that dust and debris generated during a drilling operation may be drawn into the dust collector nozzle 166 and discharged through the port 174.

With reference to FIGS. 7 and 8, the illustrated clamp assembly 118 includes a movable clamp head 178, an actuator 182 (FIG. 7), and a clamp rod 186 extending between the clamp head 178 and the actuator 182. A clamp arm 190 is fixed to the clamp head 178 for movement therewith. The jig 100 further includes an adjustment mechanism 194 that interconnects the clamp assembly 118 with the drill guide assembly 122. In particular, the adjustment mechanism 194 includes a pair of link arms 198 pivotally coupled at one end to the guide block 134 and at the other end to two arms 202 extending from the clamp head 178 (FIG. 8). The adjustment mechanism 194 translates longitudinal movement of the clamp head 178 into pivoting movement of the guide block 134 about the pivot point 136. That is, movement of the clamp head 178 toward the guide block 134 pivots the guide block 134 in a first direction 206, and movement of the clamp head 178 away from the guide block 134 pivots the guide block 134 in a second direction 210 opposite the first direction 206 (FIG. 6). The adjustment mechanism 194 is calibrated to automatically align the guide axes 154, 158 for proper drilling of a pocket hole in a workpiece clamped by the clamp assembly 118.

In addition to facilitating efficient and convenient adjustment of the drill guide assembly 122, the illustrated embodiment of the adjustment mechanism 194 enables the pocket hole jig 100 to have a relatively thin body 126. With reference to FIG. 7, the body 126 defines a thickness or height H measured between base surface 134 (which is an upper base surface in the illustrated embodiment) and a lower base surface 135 opposite the upper base surface 134. In the illustrated embodiment, the height H is about 1.5 inches; however, in other embodiments, the height H may vary. In addition to being relatively compact, the 1.5 inch height H permits the upper surface 134 of the body 126 to sit flush with the upper surface of adjacent standard 1.5-inch thick material. Accordingly, commonly-found materials can be used to effectively extend the upper base surface 134, which may provide increased stability when positioning large workpieces on the pocket hole jig 100.

In operation, a user places a workpiece of a particular thickness on the base surface 134, then user clamps the with the clamp assembly 118. The adjustment mechanism 194 automatically sets orientation of the guide block 134 (and, therefore, the guide axes 154, 158) to a proper setting for the workpiece thickness. With the guide block 134 in the proper setting, a user can insert a drill bit through one of the cylindrical passages 146, 150 and drill a pocket hole in the workpiece. The drill bit will exit the workpiece at the appropriate location (i.e. in the center of the edge of the workpiece defining the workpiece thickness) for use as a pocket hole and a pocket hole type connection to another workpiece.

Figure 9:
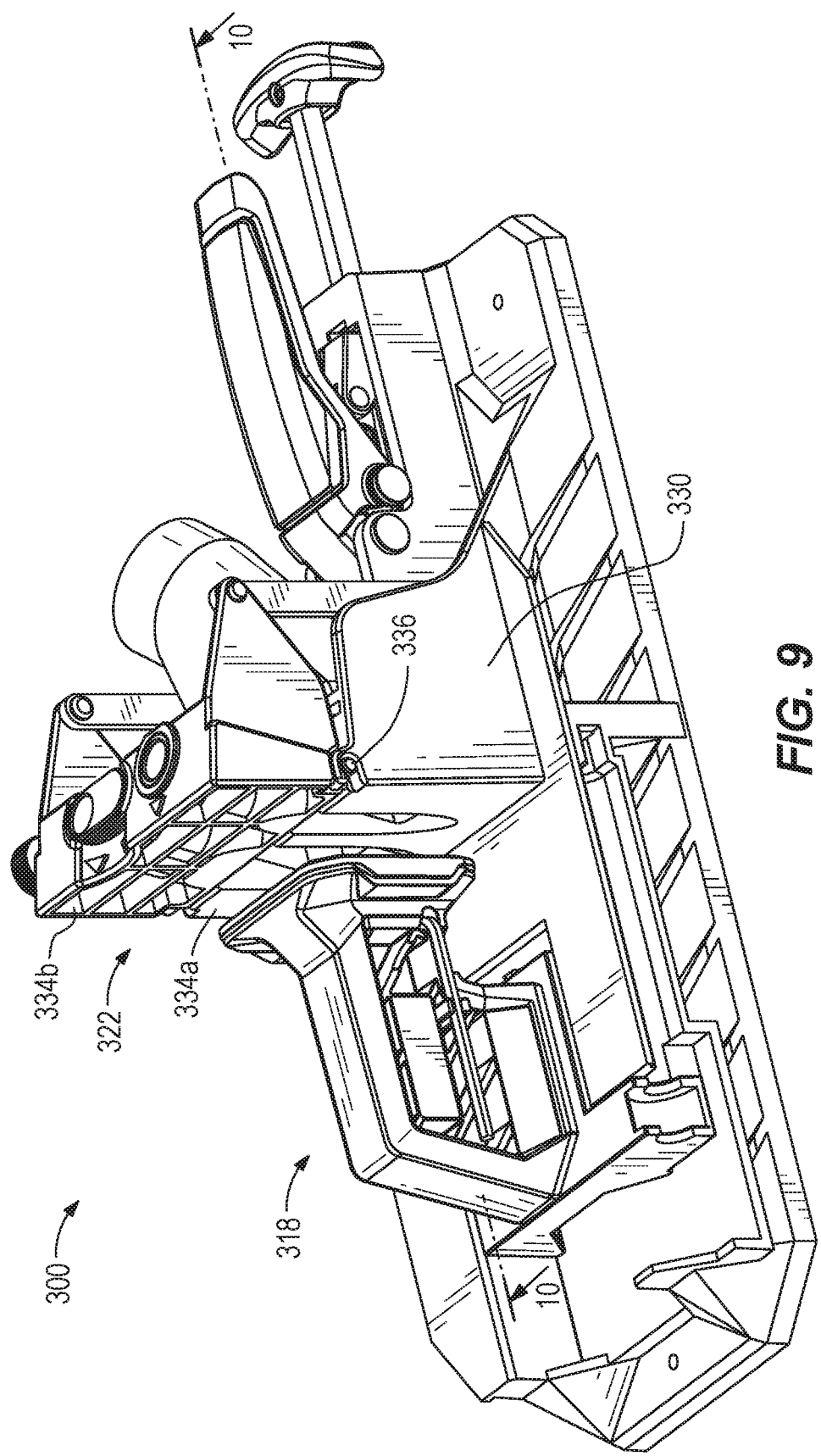
FIG. 9 is a perspective view of a pocket hole jig according to another embodiment.
Figure 10:
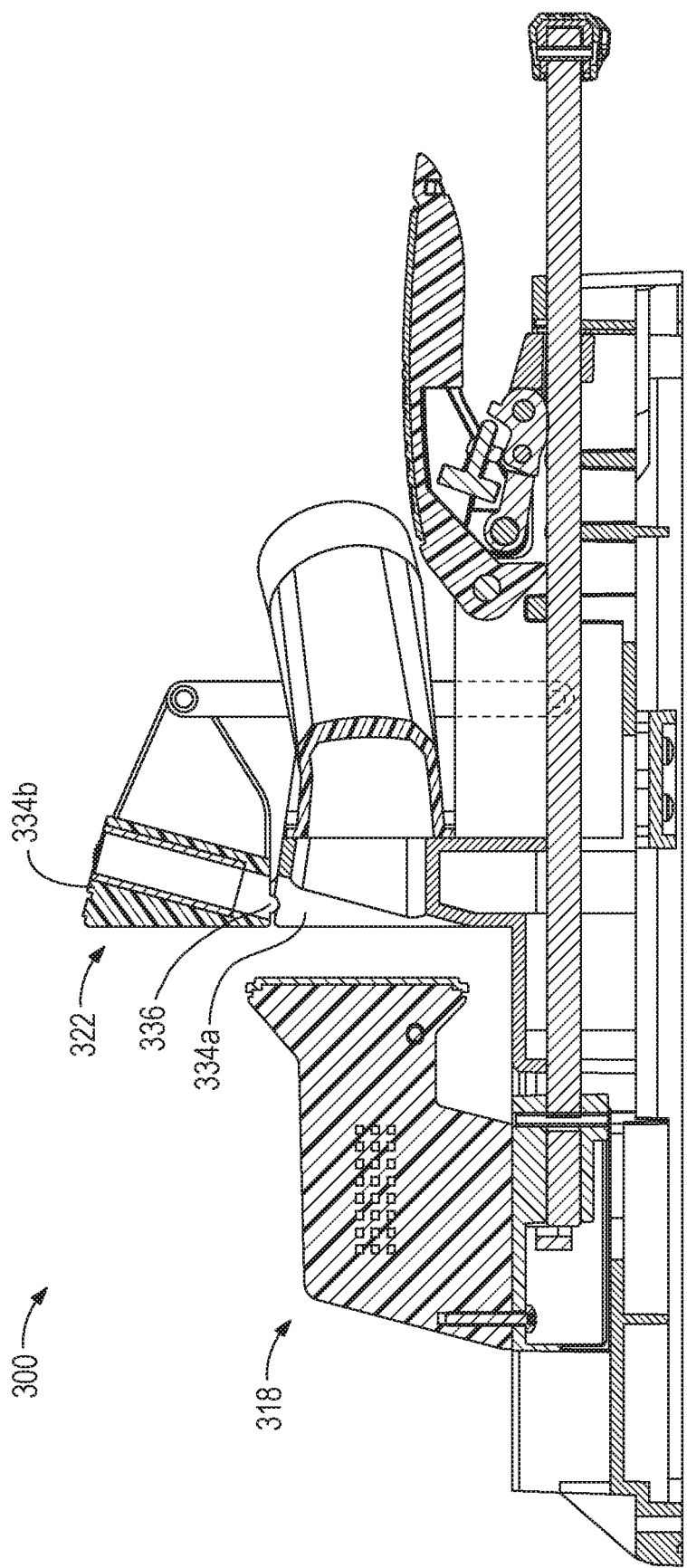
FIG. 10 is a cross-sectional view of the pocket hole jig of FIG. 9, taken along line 10-10 in FIG. 9.

FIGS. 9 and 10 illustrate a pocket hole jig 300 according to another embodiment. The pocket hole jig 300 is similar to the pocket hole jig 100 of FIGS. 6-8, and features and elements of the pocket hole jig 300 corresponding with features and elements of the pocket hole jig 100 are given like reference numbers plus '200.' In the embodiment of pocket hole jig 300 illustrated in FIGS. 9 and 10, the drill guide assembly 322 includes a lower guide block portion 334a integrally formed with the guide holder 330, and an upper guide block portion 334b pivotally coupled to the lower portion 334a at a pivot point 336. Thus, in operation, the upper portion 334b is pivotable about the pivot point 336 relative to the lower portion 334a when clamping a workpiece of a particular thickness with the clamp assembly 318.

Various features of the invention are set forth in the following claims.

What is claimed is:

1. A pocket hole jig comprising:
   a body including a base surface positionable against a workpiece;
   a clamp head movable relative to the body; and
   a drill guide pivotally coupled to the body, the drill guide defining a guide axis such that a drill bit is insertable into the drill guide along the guide axis,
   wherein the drill guide is pivotable relative to the body to adjust an inclination angle of the guide axis relative to the base surface, and
   wherein the clamp head and the drill guide are interconnected such that movement of the clamp head relative to the body pivots the drill guide relative to the body.

2. The pocket hole jig of claim 1, further comprising a link pivotally coupled to the drill guide and to an arm extending from the clamp head.

3. A pocket hole jig comprising:
   a body;
   a clamp head movable relative to the body; and
   a drill guide pivotally coupled to the body, the drill guide defining a guide axis such that a drill bit is insertable into the drill guide along the guide axis,
   wherein the drill guide is pivotable relative to the body between a plurality of angular orientations, and
   wherein the clamp head and the drill guide are interconnected by a linkage such that movement of the clamp head relative to the body pivots the drill guide relative to the body.

4. The pocket hole jig of claim 3, further comprising a clamp arm fixed to the clamp head.

5. A pocket hole jig comprising:
   a base including a body and a guide holder extending from the body;
   a clamp head movably coupled to the body;
   a clamp arm fixed to the clamp head;
   a clamp actuator coupled to the base;
   a rod extending between the clamp actuator and the clamp head;
   first and second arms extending from the clamp head on opposite sides of the rod; and
   a drill guide pivotally coupled to the guide holder, the drill guide including a slanted bore configured to receive a drill bit,
   wherein the clamp head and the drill guide are interconnected such that movement of the clamp head relative to the base pivots the drill guide relative to the guide holder.

6. The pocket hole jig of claim 5, further comprising a first link extending between the first arm and the drill guide, and a second link extending between the second arm and the drill guide.

7. The pocket hole jig of claim 5, wherein the drill guide is pivotable relative to the guide holder in a first direction in response to movement of the clamp head toward the drill guide, and wherein the drill guide is pivotable relative to the guide holder in a second direction opposite the first direction in response to movement of the clamp head away from the drill guide.

* * * * *